(12) United States Patent
Kimoto et al.

(10) Patent No.: US 10,358,773 B2
(45) Date of Patent: Jul. 23, 2019

(54) RESIN PARTICLE DISPERSION, SHEET PRODUCT, AND FRICTION PLATE

(71) Applicant: DIC Corporation, Tokyo (JP)

(72) Inventors: Seiji Kimoto, Ichihara (JP); Shigenobu Kida, Ichihara (JP)

(73) Assignee: DIC Corporation, Tokyo (JP)

( * ) Notice: Subject to any disclaimer, the term of this patent is extended or adjusted under 35 U.S.C. 154(b) by 0 days.

(21) Appl. No.: 15/555,688

(22) PCT Filed: Mar. 1, 2016

(86) PCT No.: PCT/JP2016/056216
§ 371 (c)(1),
(2) Date: Sep. 5, 2017

(87) PCT Pub. No.: WO2016/143602
PCT Pub. Date: Sep. 15, 2016

(65) Prior Publication Data
US 2018/0044857 A1 Feb. 15, 2018

(30) Foreign Application Priority Data

Mar. 12, 2015 (JP) ................................. 2015-049470

(51) Int. Cl.
| | | |
|---|---|---|
| *D21H 17/00* | (2006.01) | |
| *C08K 7/02* | (2006.01) | |
| *D21H 27/00* | (2006.01) | |
| *C08L 33/26* | (2006.01) | |
| *C08L 61/06* | (2006.01) | |
| *D21H 17/37* | (2006.01) | |
| *C08L 97/02* | (2006.01) | |
| *D21H 15/10* | (2006.01) | |
| *D21H 17/36* | (2006.01) | |
| *F16D 13/64* | (2006.01) | |

(52) U.S. Cl.
CPC ............ *D21H 17/72* (2013.01); *C08K 7/02* (2013.01); *C08L 33/26* (2013.01); *C08L 61/06* (2013.01); *C08L 97/02* (2013.01); *D21H 15/10* (2013.01); *D21H 17/36* (2013.01); *D21H 17/37* (2013.01); *D21H 17/375* (2013.01); *D21H 27/00* (2013.01); *F16D 13/64* (2013.01); *C08L 2201/50* (2013.01); *C08L 2205/03* (2013.01); *C08L 2205/16* (2013.01); *F16D 2200/006* (2013.01)

(58) Field of Classification Search
USPC ........................................................ 162/146
See application file for complete search history.

(56) References Cited

U.S. PATENT DOCUMENTS

| | | | |
|---|---|---|---|
| 4,101,500 | A | 7/1978 | Brodsky |
| 2009/0162642 | A1 | 6/2009 | Ono et al. |

FOREIGN PATENT DOCUMENTS

| | | |
|---|---|---|
| JP | 11-217793 A | 8/1999 |
| JP | 2006-070381 A | 3/2006 |
| JP | 2007-254946 A | 10/2007 |
| JP | 2010-236153 A | 10/2010 |
| WO | 88/05097 A1 | 7/1988 |
| WO | 2012/040830 A1 | 4/2012 |

OTHER PUBLICATIONS

JP 2010 236153, Ooka Yasunobu et al., machine translation, Oct. 2010.*
JP 2007 254946, Kutsuwa Koji et al., machine translation, Oct. 2007.*
International Search Report dated May 31, 2016, issued for PCT/JP2016/056216.
Supplementary European Search Report dated Jul. 6, 2018, issued for the European patent application No. 16761572.3.

* cited by examiner

*Primary Examiner* — Mark Halpern
(74) *Attorney, Agent, or Firm* — Locke Lord LLP

(57) ABSTRACT

The present invention relates to a resin fine particle dispersion optimal for manufacturing a sheet product such as paper. Specifically, an object of the present invention is to provide a resin fine particle dispersion with which a sheet product having excellent heat resistance and high mechanical strength is obtained, and which has a small environmental load due to a small amount of resin particles remaining in wastewater after papermaking. Provided are a resin fine particle dispersion including resin fine particles (A), a fiber material (B), an ionic polyacrylamide (C), and water as essential components, and a sheet product and a friction plate using this.

10 Claims, No Drawings

RESIN PARTICLE DISPERSION, SHEET PRODUCT, AND FRICTION PLATE

This application is a 371 of PCT/JP2016/056216 filed Mar. 1, 2016

TECHNICAL FIELD

The present invention relates to a resin fine particle dispersion optimal for manufacturing a sheet product such as paper. The present invention specifically relates to a resin fine particle dispersion with which a sheet product having excellent heat resistance and high mechanical strength is obtained, and which has a small environmental load due to a small amount of resin particles remaining in wastewater after papermaking. The present invention further relates to a sheet product and a friction plate which can be obtained by using this resin fine particle dispersion.

BACKGROUND ART

A paper-like material, for example, can be obtained by a method of papermaking a dispersion essentially including fibers and a resin binder (papermaking method). As a resin binder used in the papermaking method, a water-soluble resol-type phenol resin, a phenol resin emulsion, a novolak type phenol resin powder cured with hexamethylenetetramine, or a resol type phenol resin powder is used.

However, the papermaking method has the following problems.

(1) In the case of using a water-soluble resol-type phenol resin or a phenol resin emulsion as a resin binder, aggregation is generally performed with a fixing agent such as aluminum sulfate or polyaluminum chloride. At this time, efficiency of the aggregation is not good, and thus, the resin binder may flow out into wastewater at the time of the papermaking (environmental load is high).

(2) In the case of using a novolak type phenol resin as a resin binder, a mixture obtained by simply mixing a novolak resin and a curing agent such as hexamethylenetetramine is used. However, since these are simply mixed with each other, the curing agent such as hexamethylenetetramine may be dissolved in water and easily washed away, and thus, environmental load may increase at the time of the papermaking like the above case. In addition, since the curing agent is washed away, strength of a cured product obtained by heat curing after the papermaking may not be sufficient.

(3) In the case of using a resol resin as a resin binder, the resol resin normally includes approximately 0.05% to 0.3% of free formaldehyde and approximately 5% to 10% of free phenol. Accordingly, free monomers thereof are easily washed away together with water at the time of the papermaking, and thus, environmental load may increase like the above cases. The environmental load can be decreased by using a resol resin in which the amount of free monomers in the resol resin is decreased, but flowability of the resin is poor, and as a result, strength of a cured product obtained by heat curing after the papermaking may not be sufficient.

In order to solve these problems, for example, a technology of using a resin composition including a phenol-based resin powder and an epoxy resin powder as a resin binder has been disclosed (for example, see PTL 1). However, even in the case of using a dispersion including the resin composition disclosed in PTL 1, it is insufficient to decrease the environmental load. In addition, the resin composition was insufficient to function as a binder which binds fibers, and as a result, heat resistance and strength of a product (sheet product) to be obtained are insufficient.

CITATION LIST

Patent Literature

[PTL 1] JP-A-11-217793

SUMMARY OF INVENTION

Technical Problem

An object of the present invention is to provide a resin fine particle dispersion having a small environmental load due to a small amount of resin particles remaining in wastewater after papermaking, and with which a sheet product having excellent heat resistance and high mechanical strength is obtained. The present invention further provides a sheet product, preferably a friction plate, having excellent heat resistance and high mechanical strength.

Solution to Problem

As a result of intensive studies for solving the problems, the present inventors have found that, the amount of free monomers or a resin binder flowing out into wastewater is decreased by incorporating an ionic polyacrylamide in a resin fine particle dispersion, the amount of manufacturable sheet products per unit quantity of the dispersion increases along with a decrease in the amount of the flowed-out resin binder (a yield rate is improved), the sheet product to be obtained has excellent heat resistance and mechanical strength, and the sheet product to be obtained is particularly suitably used as friction plates, a single or a plurality of which are used in an automatic transmission (simply also abbreviated as "AT") of a vehicle or a transmission of a motorcycle, thereby completing the present invention.

That is, the present invention provides a resin fine particle dispersion including resin fine particles (A), a fiber material (B), an ionic polyacrylamide (C), and water as essential components.

In addition, the present invention provides a sheet product obtained by using the resin fine particle dispersion.

Further, the present invention provides a friction plate obtained by using the resin fine particle dispersion.

Advantageous Effects of Invention

By using the resin fine particle dispersion of the present invention, it is possible to decrease the environmental load and obtain a sheet product having a high yield rate. This sheet product is particularly suitably used as a friction plate.

DESCRIPTION OF EMBODIMENTS

The resin fine particle dispersion of the present invention includes resin fine particles (A), a fiber material (B), an ionic polyacrylamide (C), and water as essential components.

The kind of a resin configuring the resin fine particles (A) is not particularly limited, and fine particles obtained by using a resin composition including a phenol resin as an essential component are preferable. The phenol resin can be broadly divided into a novolak type phenol resin (N) and a resol type phenol resin (R), and in the present invention, any of these may be used or both may be used in combination.

The number average molecular weight (Mn) of these phenol resins is preferably 300 to 2,000, from the viewpoint of providing the resin particles (A) having excellent affinity with the ionic polyacrylamide (C) and dispersibility with respect to water.

In the present invention, the number average molecular weight (Mn) is measured under the following measurement conditions by using gel permeation chromatograph (hereinafter, abbreviated as "GPC").

[Measurement Conditions of GPC]

Measurement device: "HLC-8220 GPC" manufactured by Tosoh Corporation

Column: "TSKgel 4000HXL" (7.8 mm I.D. ×300 mm) manufactured by Tosoh Corporation +"TSKgel 3000HXL" (7.8 mm I.D. ×300 mm) manufactured by Tosoh Corporation +"TSKgel 2000HXL" (7.8 mm I.D. ×300 mm) manufactured by Tosoh Corporation "TSKgel 1000HXL" (7.8 mm I.D. ×300 mm) manufactured by Tosoh Corporation Column temperature: 40° C.

Detector: RI (refractive index detector)

Data processing: "GPC-8020 model II version 4.30" manufactured by Tosoh Corporation Developing solution: tetrahydrofuran Flow rate: 1.0 mL/min Sample: material obtained by filtering 0.5% by mass of a tetrahydrofuran solution in terms of a resin solid content with a microfilter Injection volume: 0.1 mL Reference sample: the following monodisperse polystyrene and a phenol monomer were used.

(Monodisperse Polystyrene)

"A-500" manufactured by Tosoh Corporation
"A-2500" manufactured by Tosoh Corporation
"A-5000" manufactured by Tosoh Corporation
"F-1" manufactured by Tosoh Corporation
"F-2" manufactured by Tosoh Corporation
"F-4" manufactured by Tosoh Corporation
"F-10" manufactured by Tosoh Corporation
"F-20" manufactured by Tosoh Corporation As the novolak type phenol resin (N), a material obtained through a reaction between a phenolic hydroxyl group-containing compound and an aldehyde compound in the presence of an acid catalyst is used, for example.

Examples of the phenolic hydroxyl group-containing compound include phenol, cresol, xylenol, ethylphenol, butylphenol, octylphenol, phenylphenol, aminophenol, naphthol, bisphenol, biphenol, resorcinol, catechol, and compounds obtained by substituting some or all of hydrogen atoms in these compounds with halogen. These maybe used alone or in combination of two or more kinds thereof. Among these, phenol, cresol, and xylenol are preferable.

Examples of the aldehyde compound include formaldehyde, acetaldehyde, benzaldehyde, naphthaldehyde, and compounds obtained by substituting some or all of hydrogen atoms in these compounds with a halogen. These may be used alone or in combination of two or more kinds thereof.

Examples of the acid catalyst include inorganic acids such as hydrochloric acid, sulfuric acid, phosphoric acid, and boric acid; and organic acids such as oxalic acid, acetic acid, and p-toluenesulfonic acid. These may be used alone or in combination of two or more kinds thereof.

With respect to the preparing condition of the novolak type phenol resin (N), for example, a method of performing a reaction at 50° C. to 100° C. for approximately 1 to 7 hours is employable.

The molar ratio in the reaction between the phenolic hydroxyl group-containing compound and the aldehyde compound [aldehyde compound/phenolic hydroxyl group-containing compound] is preferably 0.5 to 2.0, more preferably 0.6 to 1.8, and particularly preferably 0.7 to 1.6.

Examples of the resol type phenol resin (R) include a resol type phenol resin (R1) obtained through a reaction between a phenolic hydroxyl group-containing compound and an aldehyde compound in the presence of a basic catalyst, and a resol type phenol resin (R2) obtained through a reaction between a novolak type phenol resin and an aldehyde compound in the presence of a basic catalyst.

The phenolic hydroxyl group-containing compound and the aldehyde compound used in the preparation of the resol type phenol resin (R) are the same as those used in the preparation of the novolak type phenol resin (N).

As the novolak type phenol resin, a material obtained by a reaction between the phenolic hydroxyl group-containing compound and the aldehyde compound by the same method as that used for the novolak type phenol resin (N) is used. The novolak type phenol resin may be used alone as one kind or may be used in combination of two or more kinds thereof.

Examples of the basic catalyst include alkali metal hydroxide such as lithium hydroxide, sodium hydroxide, or potassium hydroxide, ammonia, and amines such as triethylamine, tetraethylenediamine, or N-ethylpiperazine. These may be used alone or in combination of two or more kinds thereof.

With respect to the preparing condition of the resol type phenol resin (R), for example, a method of performing a reaction at 50° C. to 100° C. for approximately 1 to 7 hours is employable.

With respect to the resol type phenol resin (R1), a molar ratio in the reaction between the phenolic hydroxyl group-containing compound and the aldehyde compound [aldehyde compound/phenolic hydroxyl group-containing compound] is preferably 0.6 to 3.0, more preferably 0.7 to 2.5, and particularly preferably 0.8 to 2.0.

With respect to the resol type phenol resin (R2), a reaction ratio between the novolak type phenol resin and the aldehyde compound is preferably adjusted such that a number average molecular weight (Mn) of the resol type phenol resin (R) to be obtained is 300 to 2,000.

The resin composition configuring the resin fine particles (A) may include compounds other than the phenol resin. Examples of the other compounds include an epoxy resin, an amine compound, a polyester resin, a polyamide resin, an amino resin, an acryl resin. These may be used alone or in combination of two or more kinds thereof . Among these, an epoxy resin or an amine compound is preferable, from the viewpoint of obtaining a sheet product having excellent mechanical strength. In the case of incorporating the epoxy resin in the resin composition, a rate of the phenol resin in the resin composition is preferably 10% to 80% by mass and more preferably 25% to 60% by mass. In the case of incorporating the amine compound in the resin composition, a rate of the phenol resin in the resin composition is preferably 50% to 98% by mass.

The method of obtaining the resin fine particles (A) by using the resin composition is not particularly limited, and methods of producing particles by mechanical and physical methods are used.

Examples of the fiber material (B) used in the present invention include an organic fiber such as wood pulp, linter pulp, hemp, cotton, an aromatic polyamide fiber, nylon, polyester, rayon, a phenol fiber, an aramid fiber, a carbon fiber, a novoloid fiber, or silicon carbide; an inorganic fiber such as a glass fiber, rock wool, slag wool, a silicate fiber, a silica fiber, an alumina fiber, an alumina-silica fiber, a potassium titanate fiber, a carbon fiber, or silicon nitride; and a metal fiber such as a steel fiber, a stainless fiber, a stainless steel fiber, a copper fiber, or a brass fiber. These can be suitably selected according to the purpose of the resin fine particle dispersion, and may be used alone or in combination of two or more kinds thereof. Among these, an inorganic fiber having high heat resistance, particularly a glass fiber is preferable, and although wood pulp and an aramid fiber are an organic fiber, these are preferably used as a papermaking type friction material, from the viewpoint of obtaining excellent high temperature properties.

In the present invention, by using the ionic polyacrylamide (C), it is possible to aggregate the resin fine particles (A), the fiber material (B), and a filler included, if necessary, and perform the fixing evenly. Accordingly, the amount of the resin flowing out into wastewater is decreased, thereby decreasing the wastewater load. Since it is possible to evenly fix the resin fine particles (A) at the time of the papermaking, it is possible to obtain a sheet product having excellent heat resistance and strength.

The ionic polyacrylamide (C) used in the present invention is polyacrylamide including one of a cationic group and an anionic group, or both thereof in a molecular structure, and a polymer including an acrylamide and a polymerizable monomer including an ionic group as essential raw materials is used, for example.

The polymerizable monomer including an ionic group can be broadly divided into a polymerizable monomer including a cationic group and a polymerizable monomer including an anionic group. Examples of the polymerizable monomer including a cationic group include dimethylaminopropyl (meth)acrylamide, a quaternary salt of dimethylaminopropyl (meth)acrylamide and methyl chloride, dimethylaminoethyl (meth)acrylate, and a quaternary salt of dimethylaminoethyl (meth)acrylate and methyl chloride. These may be used alone or in combination of two or more kinds thereof. Among these, dimethylaminopropyl (meth)acrylamide) acrylamide or a quaternary salt of dimethylaminopropyl (meth)acrylamide and methyl chloride is preferable from the viewpoint of availability.

Examples of the polymerizable monomer including an anionic group include (meth)acrylic)acrylic acid, [ (meth) acryloyloxy] acetic acid, 2-carboxyethyl (meth)acrylate, 3-carboxypropyl acrylate, 1-[2-(acryloyloxy)ethyl succinate], 1-(2-acryloyloxy ethyl) phthalate, 2-(acryloyloxy) ethyl hexahydrophthalate, maleic (anhydride), fumaric acid, citraconic acid, and itaconic acid. These may be used alone or in combination of two or more kinds thereof. Among these, (meth)acrylic acid or itaconic acid is preferable, from the viewpoint of availability.

As the ionic polyacrylamide (C), in addition to the acrylamide and the polymerizable monomer including an ionic group, other polymerizable monomers may be used as raw materials. Examples of the other polymerizable monomers include (meth)acrylic acid alkyl ester such as methyl (meth) acrylate, ethyl (meth)acrylate, propyl (meth)acrylate, butyl (meth)acrylate, pentyl (meth)acrylate, hexyl (meth)acrylate, heptyl (meth)acrylate, octyl (meth)acrylate, 2-ethylhexyl (meth)acrylate, nonyl (meth)acrylate, decyl (meth)acrylate, dodecyl (meth)acrylate, myristyl (meth)acrylate, palmityl (meth)acrylate, or stearyl (meth)acrylate; cyclo ring-containing (meth)acrylate such as cyclohexyl (meth)acrylate, isoboronyl (meth)acrylate, or dicyclopentanyl (meth)acrylate; an aromatic ring-containing (meth)acrylate such as phenyl (meth)acrylate, benzyl (meth)acrylate, or phenoxyethyl acrylate; hydroxyl group-containing (meth)acrylate such as hydroxyethyl (meth) acrylate, hydroxypropyl (meth) acrylate, hydroxybutyl (meth) acrylate, or dihydroxypropyl acrylate; isocyanate group-containing (meth)acrylate such as 2-acryloyloxyethyl isocyanate, 2-methacryloyloxyethyl isocyanate, 1,1-bis(acryloyloxymethyl) ethyl isocyanate; glycidyl group-containing (meth)acrylate such as glycidyl (meth)acrylate, or 4-hydroxybutyl acrylate glycidylether; and a silyl group-containing (meth)acrylate such as 3-methacryloxypropyl trimethoxysilane. These may be used alone or in combination of two or more kinds thereof.

With respect to the ionic polyacrylamide (C), the raw materials include an acrylamide or a polymerizable monomer including an ionic group preferably in an amount of 50 mol % or more and more preferably in an amount of 80 mol % or more of the raw materials.

The ionic polyacrylamide (C) can be, for example, prepared by suitably using a chain transfer agent such as isopropyl alcohol, allyl alcohol, sodium hypophosphite, or sodium allyl sulfonate in approximately 5% to 30% by mass of an aqueous solution to which acrylamide or the polymerizable monomer including an ionic group is added, adding a polymerization initiator such as ammonium persulfate, potassium persulfate, sodium persulfate, or persulfate thereof and a reducing agent such as sodium bisulfite, under the conditions in which pH at the time of initiation of polymerization is 3 to 6, and heating the mixture at 35° C. to 95° C. for 1 to 10 hours.

The ionic polyacrylamide (C) can be broadly divided into the following three kinds, in accordance with the kinds of the ionic group in a molecular structure.

1. Amphoteric ionic polyacrylamide (C1) including both of a cationic group and an anionic group as an ionic group 2. Cationic polyacrylamide (C2) including only a cationic group as an ionic group 3. Anionic polyacrylamide (C3) including only a cationic group as an ionic group The amphoteric ionic polyacrylamide (C1) may include both of a cationic group and an anionic group in a molecular structure, and for example, a polymer formed of acrylamide, a polymerizable monomer including a cationic group, a polymerizable monomer including an anionic group, and if necessary, other polymerizable monomers, is used. Among these, it is preferable to use the polymerizable monomer including an anionic group and the polymerizable monomer including a cationic group in a total content of 1.1 to 32 mol % with respect to the reaction raw materials of the amphoteric ionic polyacrylamide (C1). In addition, a molar ratio between the polymerizable monomer including an anionic group and the polymerizable monomer including a cationic group [(polymerizable monomer including an anionic group)/(polymerizable monomer including a cationic group)] is preferably a ratio of 10/90 to 80/20 and more preferably a ratio of 20/80 to 60/40.

The cationic polyacrylamide (C2) may include a cationic group in a molecular structure, and for example, a polymer formed of acrylamide, a polymerizable monomer including a cationic group, and if necessary, other polymerizable monomers is used. Among these, it is preferable to used the polymerizable monomer including a cationic group in an amount of 1 to 30 mol % and more preferably in an amount of 5 to 25 mol % with respect to the reaction raw materials of the cationic polyacrylamide (C2).

The anionic polyacrylamide (C3) may include an anionic group in a molecular structure, and for example, a polymer formed of acrylamide, a polymerizable monomer including an anionic group, and if necessary, other polymerizable monomers is used. Among these, it is preferable to use the polymerizable monomer including an anionic group in an amount of 1 to 30 mol % and more preferably in an amount of 5 to 25 mol % with the respect to the reaction raw materials of the anionic polyacrylamide (C3).

The ionic polyacrylamide (C) may be used alone as one kind or may be used in combination of two or more kinds thereof.

With respect to the ionic polyacrylamide (C), a degree of ionization is preferably −5 to 5 meq/g, from the viewpoint of obtaining a sheet product having excellent heat resistance and strength. More specifically, in the case where the ionic polyacrylamide (C) is the amphoteric ionic polyacrylamide (C1), a degree of ionization is preferably −4 to 4 meq/g and more preferably −3 to 3 meq/g. In the case where the ionic polyacrylamide (C) is the cationic polyacrylamide (C2), a degree of ionization is preferably 0.01 to 10 meq/g and more preferably 0.1 to 8 meq/g. In the case where the ionic polyacrylamide (C) is the anionic polyacrylamide (C3), a degree of ionization is preferably −10 to −0.01 meq/g and more preferably −8 to −0.1 meq/g.

In the present invention, the degree of ionization of the ionic polyacrylamide (C) is measured by the following method.

1. The ionic polyacrylamide (C) is diluted with water and an aqueous solution including 0.005% by mass of the ionic polyacrylamide (C) is adjusted.
2. In the case where the aqueous solution is acidic, pH of the aqueous solution is adjusted to 7.0 with sodium hydroxide having a concentration of 0.1 mol/L, and in the case where the aqueous solution is alkaline, pH of the aqueous solution is adjusted to 7.0 with 0.5% by mass of sulfuric acid aqueous solution.

In the case where the ionic polyacrylamide (C) is the amphoteric ionic polyacrylamide (C1) and is polyacrylamide showing anionic properties, and the pH is adjusted to 7.0, polychlorinated diallyldimethylammonium chloride (hereinafter, abbreviated as "p-DADMAC") is added until a streaming potential of the aqueous solution, pH of which is adjusted to 7.0, becomes zero, and the degree of ionization is measured based on the amount of p-DADMAC added.

In the case where the ionic polyacrylamide (C) is the amphoteric ionic polyacrylamide (C1) and is polyacrylamide showing cationic properties, and the pH is adjusted to 7.0, potassium polyvinyl sulfate (hereinafter, abbreviated as "PVSK") is added until a streaming potential of the aqueous solution, pH of which is adjusted to 7.0, becomes zero, and the degree of ionization is measured based on the amount of PVSK added.

In the case where the ionic polyacrylamide (C) is the cationic polyacrylamide (C2), PVSK is added until a streaming potential of the aqueous solution, pH of which is adjusted to 7.0, becomes zero, and the degree of ionization is measured based on the amount of PVSK added.

In the case where the ionic polyacrylamide (C) is the anionic polyacrylamide (C3), p-DADMAC is added until a streaming potential of the aqueous solution, pH of which is adjusted to 7.0, becomes zero, and the degree of ionization is measured based on the amount of p-DADMAC added.

The streaming potential is measured by using a streaming potential meter (PCD) manufactured by Mutek.

With respect to the ionic polyacrylamide (C), viscosity in terms of 10% by mass of an aqueous solution thereof is preferably 300 to 100,000 cps (25° C., Brookfield viscosity) and more preferably 800 to 20,000 cps, from the viewpoints of obtaining a resin fine particle dispersion which has a small environmental load due to a small amount of resin particles (A) remaining in wastewater after papermaking, and obtaining a sheet product having excellent heat resistance and high mechanical strength.

A commercially available product of the ionic polyacrylamide (C) can also be used. As the amphoteric ionic polyacrylamide (C1), for example, "HarmideEX-200"or "Harmide EX-300" manufactured by Harima Chemicals Group, Inc. is used. As the cationic polyacrylamide (C2), for example, "Polystron 705", "ARAFIX 100", or "ARAFIX 255" manufactured by Arakawa Chemical Industries, Ltd. or "Harifix U-570" manufactured by Harima Chemicals Group, Inc. is used. As the anionic polyacrylamide (C3), for example, "Polystron 117" manufactured by Arakawa Chemical Industries, Ltd. or "Harmide C-10" or "Harmide B-15" by Harima Chemicals Group, Inc. is used.

The amount of the ionic polyacrylamide (C) to be blended in the resin fine particle dispersion is preferably 0.001 to 2.0 parts by mass and more preferably 0.01 to 1.5 parts by mass with respect to 100 parts by mass of the fiber material (B), from the viewpoint of obtaining a sheet product having high mechanical strength.

More preferably, the ionic polyacrylamide (C) is preferably blended such that an ionic parameter acquired by the following equation is −0.45 to 0.35 meq/g, and the ionic polyacrylamide (C) is more preferably blended such that an ionic parameter is −0.42 to 0.33 meq/g.

Ionic parameter (meq/g)=Σ[degree of ionization of ionic polyacrylamide (C) (meq/g)×a blending rate of ionic polyacrylamide (C) with respect to fiber material (B) (% by mass)]

The resin fine particle dispersion of the present invention may include a curing agent (D), in addition to the resin fine particles (A), the fiber material (B), the ionic polyacrylamide (C), and water. In the case where the resin fine particles (A) is formed of a resin composition including the novolak type phenol resin (N), examples of the curing agent (D) include an amine compound such as hexamethylenetetramine; an aldehyde compound such as paraformaldehyde or 1,3,5-trioxane; and an epoxy resin such as a bisphenol A-type epoxy resin, a bisphenol F-type epoxy resin, or a phenol novolak type epoxy resin, and a resol type phenol resin. These may be used alone or in combination of two or more kinds thereof.

Among these, one or more kinds selected from the group consisting of hexamethylenetetramine, a resol type phenol resin, and an epoxy resin are preferable, from the viewpoints of obtaining a sheet product having excellent heat resistance and mechanical strength and availability.

The blending amount of the curing agent (D) is preferably 3 to 20 parts by mass and more preferably 5 to 15 parts by mass with respect to 100 parts by mass of the resin fine particles (A).

With respect to the blending rates of the components in the resin fine particle dispersion of the present invention, that are the blending rates of the resin fine particles (A), the fiber material (B), the ionic polyacrylamide (C), the curing agent (D), and water, in the case where the resin fine particles (A) is formed of a resin composition including the novolak type phenol resin (N), it is preferable that the blending rate of the resin fine particles (A) is 0.1% to 50% by mass, the blending rate of the fiber material (B) is 0.5% to 80% by mass, the blending rate of the ionic polyacrylamide (C) is 0.001% to 1% by mass, the blending rate of the curing agent (D) is 0.1% to 75% by mass, and the blending rate of water is 50% to 99% by mass, from the viewpoints of obtaining a dispersion showing excellent dispersion, and obtaining a sheet product having a high yield rate, a small environmental load, and excellent mechanical strength. It is more preferable that the blending rate of the resin fine particles (A) is 0.2% to 40% by mass, the blending rate of the fiber material (B) is 1% to 70% by mass, the blending rate of the ionic polyacrylamide (C) is 0.002% to 0.9% by mass, the blending rate of the curing agent (D) is 0.2% to 70% by mass, and the blending rate of water is 60% to 98% by mass.

With respect to the blending rates of the resin fine particles (A), the fiber material (B), the ionic polyacrylamide (C), and water, in the case where the resin fine particles (A) is formed of a resin composition including the resol type phenol resin (R), it is preferable that the blending rate of the resin fine particles (A) is 0.1% to 50% by mass, the blending rate of the fiber material (B) is 0.5% to 80% by mass, the blending rate of the ionic polyacrylamide (C) is 0.001% to 1% by mass, and the blending rate of water is 50% to 99% by mass, from the viewpoints of obtaining a dispersion showing excellent dispersion, and obtaining a sheet product having a high yield rate, a small environmental load, and excellent mechanical strength. It is more preferable that the blending rate of the resin fine particles (A) is 0.2% to 40% by mass, the blending rate of the fiber material (B) is 1% to 70% by mass, the blending rate of the ionic polyacrylamide (C) is 0.002% to 0.9% by mass, and the blending rate of the curing agent (D) is 60% to 98% by mass.

The sheet product of the present invention is obtained by papermaking using the resin fine particle dispersion of the present invention. Specifically, a paper-like sheet product can be obtained by producing a sheet using the resin fine particle dispersion of the present invention according to the conventional method and heating and pressurizing this sheet.

The resin fine particle dispersion of the present invention can be suitably used as a dispersion for obtaining a sheet product, as described above. This sheet product can be used, for example, instead of a material manufactured by a method (impregnating method) of impregnating the fiber material with a resin solution in the related art. Specifically, a friction plate such as a wet friction material, a half board, a semi-half board, or an air filter is used.

In the case of obtaining a friction plate by using the resin fine particle dispersion of the present invention, a friction modifier may be added, if necessary. Examples of the friction modifier include wollastonite, diatomaceous earth, silica, barium sulfate, calcium carbonate, inorganic or cashew dust such as silicon oxide, and graphite. These friction modifiers maybe used as a mixture of two or more kinds thereof. The rate of the fiber material (B) and the friction modifier is preferably 1 to 60 parts by mass with respect to 100 parts by mass of the fiber material (B).

In the case of using an epoxy resin as the curing agent (D), a curing accelerator can also be included in the resin fine particle dispersion of the present invention, in order to proceed curing of the epoxy resin. As the curing accelerator, general-purpose materials used as a ring-opening catalyst of an epoxy group can be used. For example, imidazoles such as 2-phenylimidazole or 2-phenyl-4-imidazole, or a phosphorus-based compound represented by triphenylphosphine (TPP) is used. In the case where the curing accelerator is liquid, it is preferable that the curing accelerator is added into the novolak type phenol resin (N) by thermofusion mixing in advance. The amount of the curing accelerator is 0.05% to 3% by mass and preferably 0.1% to 1.0% by mass with respect to the epoxy resin used.

EXAMPLES

Hereinafter, the present invention will be described with reference to the examples. All of % in the examples are based on mass.

Synthesis Example 1

Synthesis of Novolak Type Phenol Resin (N-1)

94.1 g (1 mol) of phenol, 64.9 g (0.8 mol) of 37% formaldehyde, and 0.56 g (0.004 mol) of oxalic acid dihydrate were put into a 500 ml four-neck flask with which a stirrer, a thermometer, and a cooling tube were set, the mixture was heated to 100° C. over 1 hour, and a reaction was allowed at 100° C. for 5 hours. After that, dewatering was performed under the ordinary pressure until the temperature became 180° C. Furthermore, dewatering was performed under reduced pressure at 180° C. for 2 hours while blowing vapor, the residue was taken out, and thus, a novolak type phenol resin (N-1) having a number average molecular weight (Mn) of 792 was obtained.

Synthesis Example 2

Synthesis of Resol Type Phenol Resin (R-1)

94.1 g (1 mol) of phenol, 101.5 g (1.25 mol) of 37% formaldehyde, and 20.5 g (0.3 mol) of 25% ammonia water were put into a 500 ml four-neck flask with which a stirrer, a thermometer, and a cooling tube were set, the mixture was heated to 80° C. over 1 hour, and a reaction was allowed at 80° C. for 2 hours. The temperature was increased to 95° C. while performing dewatering under reduced pressure, the residue was taken out, and thus, a resol type phenol resin (R-1) having (Mn) of 330 was obtained.

Synthesis Example 3

Synthesis of Resol Type Phenol Resin (R-2)

94.1 g (1 mol) of phenol, 121.7 g (1.5 mol) of 37% formaldehyde, and 13.5 g (0.3 mol) of 25% ammonia water were put into a 500 ml four-neck flask with which a stirrer, a thermometer, and a cooling tube were set, the mixture was heated to 80° C. over 1 hour, and a reaction was allowed at 80° C. for 2 hours. The temperature was increased to 95° C. while performing dewatering under reduced pressure, the residue was taken out, and thus, a resol type phenol resin (R-2) having (Mn) of 407 was obtained.

Preparation Example 1

Preparation of Resin Fine Particles (A-1)

The novolak type phenol resin (N-1) and the resol type phenol resin (R-2) were blended with each other at amass ratio of 80:20, and mixed with each other while pulverizing with a mortar, and a mixture of fine particles including fine particles of the novolak type phenol resin (N-1) and fine particles of the resol type phenol resin (R-2) in a mixed manner, was obtained. In the case where a content of a non-volatile component of this mixture at 200° C. was measured, the content thereof was 96.2% by mass. Hereinafter, this mixture was referred to as resin fine particles (A-1).

Preparation Example 2

Preparation of Resin Fine Particles (A-2)

The novolak type phenol resin (N-1) and EPICLON N-690 (manufactured by DIC Corporation) which is a cresol type epoxy resin were blended with each other at a mass ratio of 33:67, and mixed with each other while pulverizing with a mortar, and a mixture of fine particles including fine particles of the novolak type phenol resin (N-1) and fine particles of EPICLON N-690 in a mixed manner, was obtained. In the case where a content of a non-volatile component of this mixture at 200° C. was measured, the content thereof was 98.3% by mass. Hereinafter, this mixture was referred to as resin fine particles (A-2).

Preparation Example 3

Preparation of Resin Fine Particles (A-3)

Fine particles of a resol type phenol resin manufactured by Air Water Inc. (Bellpearl 5899) was used as it is, as resin fine particles of the resol type phenol resin. In the case where a content of a non-volatile component of these fine particles at 200° C. was measured, the content thereof was 94.2% by mass. Hereinafter, these fine particles was referred to as resin fine particles (A-3).

Preparation Example 4

Preparation of Resin Fine Particles (A-4)

The resol type phenol resin (R-1) was pulverized with a mortar and fine particles of the resol type phenol resin (R-1) were obtained. In the case where a content of a non-volatile component of these fine particles at 200° C. was measured, the content thereof was 89.2% by mass. Hereinafter, these fine particles was referred to as resin fine particles (A-4).

Preparation Example 5

Preparation of Resin Fine Particles (A-5)

The novolak type phenol resin (N-1) and hexamethylenetetramine were blended with each other at amass ratio of 94:6, and mixed with each other while pulverizing with a mortar, and a mixture of fine particles including fine particles of the novolak type phenol resin (N-1) and hexamethylenetetramine was obtained. In the case where a content of a non-volatile component of this mixture at 200° C. was measured, the content thereof was 98.3% by mass. Hereinafter, this mixture was referred to as resin fine particles (A-5).

Synthesis Example 4

Synthesis of Ionic Polyacrylamide (C-1)

543.2 g of water, 4.16 g of itaconic acid, 7.49 g of dimethylaminopropyl acrylamide, 138.05 g of 50% acrylamide aqueous solution, and 16.82 g of 2% aqueous sodium hypophosphite solution were put into a 1,000 ml four-neck flask with which a stirrer, a thermometer, a cooling tube, and a nitrogen introduction tube were set, and pH was adjusted to 4.0 by using a 15% sulfuric acid aqueous solution. The temperature was increased to 60° C. under the introduction of nitrogen gas, 3.65 of a 5% ammonium peroxodisulfate aqueous solution was added, and a polymerization reaction was started. After that, a reaction was allowed at 75° C. for 1.5 hours, 1.82 g of a 5% ammonium peroxodisulfate aqueous solution was added, a reaction was further allowed for 1.5 hours, and an aqueous solution having 10.2% of non-volatile component of the ionic polyacrylamide (C-1) was obtained. The degree of ionization in the case where the pH of the ionic polyacrylamide (C-1) was 7, was meq/g in terms of the solid content. 10.2% aqueous solution viscosity of the ionic polyacrylamide (C-1) was 20,000 cps.

Synthesis Example 5

Synthesis of Ionic Polyacrylamide (C-2)

543.2 g of water, 28.12 g of dimethylaminopropyl acrylamide, 116.57 g of 50% acrylamide aqueous solution, and 16.82 g of 2% aqueous sodium hypophosphite solution were put into a 1,000 ml four-neck flask with which a stirrer, a thermometer, a cooling tube, and a nitrogen introduction tube were set, and pH was adjusted to 4.0 by using a 15% sulfuric acid aqueous solution. The temperature was increased to 60° C. under the introduction of nitrogen gas, 3.65 of a 5% ammonium peroxodisulfate aqueous solution was added, and a polymerization reaction was started. After that, a reaction was allowed at 75° C. for 1.5 hours, 1.82 g of a 5% ammonium peroxodisulfate aqueous solution was added, a reaction was further allowed for 1.5 hours, and an aqueous solution having 10.2% of non-volatile component of the ionic polyacrylamide (C-2) was obtained. The degree of ionization in the case where the pH of the ionic polyacrylamide (C-2) was 7, was +2.0 meq/g in terms of solid content. 10.2% aqueous solution viscosity of the ionic polyacrylamide (C-2) was 45,000 cps.

Synthesis Example 6

Synthesis of Ionic Polyacrylamide (C-3)

543.2 g of water, 23.42 g of itaconic acid, 133.63 g of 50% acrylamide aqueous solution, and 16.82 g of 2% aqueous sodium hypophosphite solution were put into a 1,000 ml four-neck flask with which a stirrer, a thermometer, a cooling tube, and a nitrogen introduction tube were set, and pH was adjusted to 4.0 by using a 15% sulfuric acid aqueous solution. The temperature was increased to 60° C. under the introduction of nitrogen gas, 3.65 of a 5% ammonium peroxodisulfate aqueous solution was added, and a polymerization reaction was started. After that, a reaction was allowed at 75° C. for 1.5 hours, 1.82 g of a 5% ammonium peroxodisulfate aqueous solution was added, a reaction was further allowed for 1.5 hours, and an aqueous solution having 10.2% of non-volatile component of the ionic polyacrylamide (C-3) was obtained. The degree of ionization in the case where the pH of the ionic polyacrylamide (C-3) was 7, was -1.6 meq/g in terms of solid content. 10.2% aqueous solution viscosity of the ionic polyacrylamide (C-3) was 15,000 cps.

Example 1

Preparation of Resin Fine Particle Dispersion (1)

5.9 g of pulp, 5.9 g of an aramid fiber (Twaron 1097 manufactured by Toray Industries, Inc.), and 5.2 g of diatomaceous earth (Celite 281 manufactured by Toshin Chemicals Co., Ltd.) were put into 1 L of water (electric conductivity: 350 μS/cm, pH 7.5), and stirred with a mixer for 1 minute. Then, 7.59 g of the resin fine particles (A-1) were added and further stirred for 1 minute. After that, 2.4 L of water was added thereto, 0.2% by mass of the ionic polyacrylamide (C-1) in terms of a solid content with respect to the fiber component was added, 0.01% by mass of the ionic polyacrylamide (C-2) in terms of a solid content with respect to the fiber component was added, and thus, a resin fine particle dispersion (1) was obtained. The ionic parameter acquired by the following equation was −0.08 meq/g.

Ionic parameter (meq/g)=Σ[degree of ionization of ionic polyacrylamide (C) (meq/g)×a blending rate of ionic polyacrylamide (C) with respect to fiber material (B) (% by mass)]

A sheet product was obtained by subjecting this resin fine particle dispersion (1) to papermaking by means of a square sheet machine (papermaking machine) having a size of 250×250 mm to perform. The obtained sheet product was subjected to pressure dehydration, dried at 100° C. for 3 minutes, and subjected to heat curing at 200° C. for 10 minutes, thereby obtaining a cured sheet product.

The yield rate at the time of the papermaking, the amount of environmental load, and strength of the cured sheet product were evaluated by the following methods. The evaluation results are shown in Table 2.

<Evaluation Method of Yield Rate at Time of Papermaking>

The yield rate (%) was obtained by the following equation. As the yield rate (%) is high, the amount of resin particles remaining in wastewater after the papermaking is small and the amount of environmental load is small.

Yield rate (%)=[(mass after curing)/(total of mass of fiber components and mass of solid contents of resin fine particles)]×100

<Amount of Environmental Load>

With respect to the case where a sheet product was obtained by using the resin fine particle dispersion, chemical oxygen demand (COD) with respect to wastewater discharged and the content of a phenolic hydroxyl group-containing compound in the wastewater were measured. As the COD is low, or as the content of the phenolic hydroxyl group-containing compound in the wastewater is small, the amount of environmental load is small. The measurement of COD was performed in accordance with JIS K 0102 17 method. The measurement of the content of the phenolic hydroxyl group-containing compound was performed in accordance with JIS K 0102 28.1 method.

<Evaluation Method of Strength of Cured Sheet Product>

The strength of the sheet product was evaluated by measuring the tensile shear strength. Specifically, for shear strength, a steel sheet (JIS G 3141) having a size of 0.8 mm ×25 mm×150 mm was degreased with acetone and coated with an adhesive, and the cured sheet product cut to have a size of 15 mm×25 mm was press-bonded thereto, and thus, a sample for tensile shear strength measurement was prepared. The measurement of the tensile shear strength was performed by setting a load full scale of 5 kN and a test speed of 1 mm/min.

Examples 2 to 13 and Comparative Examples 1 to 7

Sheet products cured in the same manner as in Example 1 were obtained except for setting the blending amounts shown in Table 1, respectively. The same evaluations as in Example 1 were performed and the results thereof are shown in Table 2.

TABLE 1

| | Resin fine particles (A) [amount added (g)] | Fiber material (B) [amount added (g)] | | Ionic polyacrylamide (C) * Rate added to fiber material (B) (wt %) | | | Ionic parameter (meq/g) |
|---|---|---|---|---|---|---|---|
| | | Pulp | Aramid fiber | Diatomaceous earth | C-1 | C-2 | C-3 | |
| Example 1 | A-1 (7.59) | 5.9 | 5.9 | 5.2 | 0.2 | 0.01 | — | −0.08 |
| Example 2 | A-2 (7.43) | 5.9 | 5.9 | 5.2 | 0.2 | 0.01 | — | −0.08 |
| Example 3 | A-3 (7.75) | 5.9 | 5.9 | 5.2 | 0.2 | 0.01 | — | −0.08 |
| Example 4 | A-1 (7.59) | 17 | — | — | 0.2 | 0.01 | — | −0.08 |
| Example 5 | A-3 (7.75) | 17 | — | — | 0.2 | 0.01 | — | −0.08 |
| Example 6 | A-4 (8.18) | 17 | — | — | 0.2 | 0.01 | — | −0.08 |
| Example 7 | A-5 (7.55) | 17 | — | — | 0.2 | 0.01 | — | −0.08 |
| Example 8 | A-1 (11.7) | 26.3 | — | — | 0.2 | 0.01 | — | −0.08 |
| Example 9 | A-1 (7.59) | 17 | — | — | 1.0 | 0.05 | — | −0.4 |
| Example 10 | A-1 (7.59) | 17 | — | — | — | 0.05 | — | 0.1 |
| Example 11 | A-1 (7.59) | 17 | — | — | — | 0.05 | 0.1 | −0.06 |
| Example 12 | A-1 (7.59) | 17 | — | — | 1 | — | — | −0.5 |
| Example 13 | A-1 (7.59) | 17 | — | — | — | — | 0.1 | 0.4 |
| Comparative Example 1 | A-1 (7.59) | 5.9 | 5.9 | 5.2 | — | — | — | — |
| Comparative Example 2 | A-2 (7.43) | 5.9 | 5.9 | 5.2 | — | — | — | — |

TABLE 1-continued

| | Resin fine particles (A) [amount added (g)] | Fiber material (B) [amount added (g)] | | | Ionic polyacrylamide (C) * Rate added to fiber material (B) (wt %) | | | Ionic parameter (meq/g) |
|---|---|---|---|---|---|---|---|---|
| | | Pulp | Aramid fiber | Diatomaceous earth | C-1 | C-2 | C-3 | |
| Comparative Example 3 | A-1 (7.75) | 5.9 | 5.9 | 5.2 | — | — | — | — |
| Comparative Example 4 | A-1 (7.59) | 17 | — | — | — | — | — | — |
| Comparative Example 5 | A-3 (7.75) | 17 | — | — | — | — | — | — |
| Comparative Example 6 | A-5 (7.55) | 17 | — | — | — | — | — | — |
| Comparative Example 7 | A-1 (7.59) | 26.3 | — | — | — | — | — | — |

TABLE 2

| | Yield rate (%) | Wastewater load | | Shear strength (Mpa) |
|---|---|---|---|---|
| | | COD (mg/l) | Content of phenolic hydroxyl group-containing compound (mg/l) | |
| Example 1 | 96.3 | 9.4 | 0.3 | 1.9 |
| Example 2 | 95.8 | 24 | 0.2 | 1.6 |
| Example 3 | 94.5 | 8 | 0.3 | 1.7 |
| Example 4 | 96.4 | 26 | 0.8 | 6.1 |
| Example 5 | 97.4 | 9.8 | 0.2 | 4.8 |
| Example 6 | 95.9 | 12.1 | 0.7 | 4.7 |
| Example 7 | 97.5 | 31.6 | 0.9 | 3.8 |
| Example 8 | 97.6 | 50.1 | 0.7 | 4.7 |
| Example 9 | 95.9 | 10.2 | 0.3 | 6.5 |
| Example 10 | 98.1 | 9.2 | 0.2 | 5.9 |
| Example 11 | 98.1 | 9.0 | 0.2 | 6.0 |
| Example 12 | 93 | 15 | 0.4 | 5.1 |
| Example 13 | 95 | 13 | 0.3 | 4.7 |
| Comparative Example 1 | 81.7 | 105 | 3.8 | 1.8 |
| Comparative Example 2 | 84.4 | 117 | 0.2 | 1.7 |
| Comparative Example 3 | 82.8 | 43.6 | 14 | 1.5 |
| Comparative Example 4 | 91.4 | 226 | 15 | 5.6 |
| Comparative Example 5 | 93.6 | 56 | 0.6 | 3.4 |
| Comparative Example 6 | 88.8 | 59.4 | 1.9 | 3.3 |
| Comparative Example 7 | 94.6 | 126 | 1.6 | 4.0 |

The invention claimed is:

1. A friction plate comprising a resin fine particle dispersion, wherein the resin fine particle dispersion comprises resin fine particles (A), a fiber material (B), an ionic polyacrylamide (C), and water as essential components,
wherein the resin fine particles (A) comprises a resin composition including a phenol resin as an essential component;
the phenol resin is a novolak type phenol resin (N) or a resol type phenol resin (R) or a combination thereof;
the number average molecular weight (Mn) of the phenol resin is in the range of 300 to 2,000;
a blending rate of the resin fine particles (A) is 0.1% to 50% by mass in the resin fine particle dispersion.

2. The friction plate according to claim 1,
wherein a degree of ionization of the ionic polyacrylamide (C) is from −5 to 5 meq/g.

3. The friction plate according to claim 1,
wherein a blending amount of the ionic polyacrylamide (C) is from 0.001 to 2.0 parts by mass with respect to 100 parts by mass of the fiber material (B).

4. The friction plate according to claim 1,
wherein an ionic parameter acquired by the following equation is from −0.45 to 0.35 meq/g:
Ionic parameter (meq/g)=Σ [degree of ionization of ionic polyacrylamide (C) (meq/g)×a blending rate of ionic polyacrylamide (C) with respect to fiber material (B) (% by mass)].

5. The friction plate according to claim 1,
wherein the resin fine particle dispersion further comprises a curing agent (D).

6. The friction plate according to claim 5,
wherein the blending rate of the resin fine particles (A) is 0.1% to 50% by mass, the blending rate of the fiber material (B) is 0.5% to 80% by mass, the blending rate of the ionic polyacrylamide (C) is 0.001% to 1% by mass, the blending rate of the curing agent (D) is 0.1% to 75% by mass, and the blending rate of water is 50% to 99% by mass.

7. The friction plate according to claim 1,
wherein the blending rate of the fiber material (B) is from 0.5% to 80% by mass.

8. The friction plate according to claim 1, wherein
a viscosity in terms of 10% by mass of an aqueous solution of the ionic polyacrylamide (C) is 300 to 100,000 cps.

9. The friction plate according to claim 1, wherein
the ionic polyacrylamide (C) is a polymer consisting of a cationic and/or amphoteric acrylamide polymer.

10. The friction plate according to claim 9, wherein
the ionic polyacrylamide (C) is a polymer of the combination of dimethylaminoprolyl(meth)acrylamide and itaconic acid.

* * * * *